(12) United States Patent
Yerli

(10) Patent No.: US 11,196,972 B2
(45) Date of Patent: Dec. 7, 2021

(54) PRESENCE CAMERA

(71) Applicant: TMRW FOUNDATION IP S. À R.L., Luxembourg (LU)

(72) Inventor: Cevat Yerli, Frankfurt am Main (DE)

(73) Assignee: TMRW Foundation IP S. À R.L., Luxembourg (LU)

( * ) Notice: Subject to any disclaimer, the term of this patent is extended or adjusted under 35 U.S.C. 154(b) by 0 days.

(21) Appl. No.: 15/764,696

(22) PCT Filed: Sep. 30, 2016

(86) PCT No.: PCT/EP2016/001626
§ 371 (c)(1),
(2) Date: Mar. 29, 2018

(87) PCT Pub. No.: WO2017/054925
PCT Pub. Date: Apr. 6, 2017

(65) Prior Publication Data
US 2018/0288393 A1    Oct. 4, 2018

(30) Foreign Application Priority Data

Sep. 30, 2015   (EP) .................................... 15187627
Feb. 5, 2016    (EP) .................................... 16154501

(51) Int. Cl.
*H04N 21/218*      (2011.01)
*H04N 21/6587*     (2011.01)
(Continued)

(52) U.S. Cl.
CPC ......... *H04N 13/111* (2018.05); *H04N 13/194* (2018.05); *H04N 13/243* (2018.05);
(Continued)

(58) Field of Classification Search
CPC .. H04N 13/111; H04N 13/194; H04N 13/243; H04N 21/21805
See application file for complete search history.

(56) References Cited

U.S. PATENT DOCUMENTS 5,130,794 A      7/1992 Ritchey
10,116,911 B2   10/2018 Michalak
(Continued)

FOREIGN PATENT DOCUMENTS

CN     101651841 A    2/2012
WO      96/31047 A2  10/1996
WO     2015/142174 A1 9/2015

OTHER PUBLICATIONS

Extended European Search Report dated Oct. 19, 2016, issued in corresponding European Application No. EP 16154501.7, filed Feb. 5, 2016, 8 pages.
(Continued)

*Primary Examiner* — Grace Q Li
(74) *Attorney, Agent, or Firm* — Christensen O'Connor Johnson Kindness PLLC

(57) ABSTRACT

A device is disclosed which comprises a media interface configured to provide a plurality of media streams, each media stream being captured using a camera of at least one array of cameras, an input interface configured to receive a device position associated with an output device, and a processor configured to generate from the plurality of media streams an output stream adjusted to the device position.

21 Claims, 8 Drawing Sheets

(51) Int. Cl.
   *H04N 13/243* (2018.01)
   *H04N 13/344* (2018.01)
   *H04N 21/00* (2011.01)
   *H04N 13/111* (2018.01)
   *H04N 13/194* (2018.01)

(52) U.S. Cl.
   CPC ........... *H04N 13/344* (2018.05); *H04N 21/00* (2013.01); *H04N 21/21805* (2013.01); *H04N 21/6587* (2013.01)

(56) References Cited

U.S. PATENT DOCUMENTS

| | | | | |
|---|---|---|---|---|
| 2007/0285554 | A1* | 12/2007 | Givon | G03H 1/268 348/340 |
| 2008/0034321 | A1* | 2/2008 | Griffin | G06F 1/1626 715/799 |
| 2010/0026809 | A1* | 2/2010 | Curry | H04N 5/222 348/157 |
| 2010/0073463 | A1* | 3/2010 | Momonoi | G02B 27/2214 348/47 |
| 2010/0259595 | A1* | 10/2010 | Trimeche | H04N 21/21805 348/43 |
| 2012/0188452 | A1* | 7/2012 | Keiser | G06T 13/00 348/559 |
| 2012/0306856 | A1* | 12/2012 | Tada | A63F 13/5255 345/419 |
| 2013/0222548 | A1* | 8/2013 | Yang | H04N 13/243 348/47 |
| 2014/0072270 | A1* | 3/2014 | Goldberg | H04N 9/87 386/223 |
| 2014/0168359 | A1 | 6/2014 | Michalak | |
| 2015/0153571 | A1* | 6/2015 | Ballard | H04W 76/10 345/8 |
| 2015/0241203 | A1* | 8/2015 | Jordil | B25J 9/1623 356/4.01 |
| 2015/0286878 | A1* | 10/2015 | Molin | G06K 9/20 348/148 |
| 2016/0277772 | A1* | 9/2016 | Campbell | H04N 21/21805 |
| 2016/0334797 | A1* | 11/2016 | Ross | G05D 1/0027 |

OTHER PUBLICATIONS

International Search Report and Written Opinion dated Dec. 13, 2016, issued in corresponding International Application No. PCT/EP2016/001626, filed Sep. 30, 2016, 9 pages.

Office Action in corresponding Chinese application No. 201680056044.3, filed Feb. 29, 2020, 5 pages.

Office Action dated Sep. 23, 2021, in corresponding European application No. 16 775 468.8, 8 pages.

* cited by examiner

PRESENCE CAMERA

TECHNICAL FIELD

The disclosure relates to generation of media streams, which take viewing parameters related to an output device into consideration. In particular, the present invention may relate to a camera device including an array of cameras and a respective output device for rendering such media streams.

BACKGROUND

Cameras typically allow capturing of video data with or without audio data, which can be thereafter displayed on respective output devices. For example, a video camera may capture a video of a scene, which may be presented on a display or screen, such as on a TV. However, such captured media are typically presented to a user in a linear way and do not allow for further adaptation of the displayed media for the user.

In order to provide a more immersive experience, camera systems have been proposed that provide a large viewing angle, which may even approach 360°. For a recorded movie, a subset of the recorded pixels may be selected depending on a desired direction or a direction the viewer is looking to and the selected subset may be warped into a correct display image for an output device of the user. Hence, the user experiencing the recorded movie may look into various directions, which directly influences the displayed content.

Other approaches for providing a more immersive experience of recorded content involve stereoscopic camera systems that provide media streams for both eyes of a viewer, respectively, in order to enable the perception of depth and estimation of distances of objects within a recorded scene. However, there is still a discrepancy between presentation of recorded media and perception of the real world.

Therefore, one object of the present disclosure is to enable generation and presentation of captured media that more closely resembles perception of the real world.

SUMMARY

The above problem is solved by a device, a camera device, an output device and a method according to the independent claims. Preferred embodiments are defined in the dependent claims.

According to one aspect of the present disclosure, a device comprises a media interface configured to provide a plurality of media streams, each media stream being captured using a camera of at least one array of cameras, an input interface configured to receive a viewing position associated with an output device, and a processor configured to generate from the plurality of media streams an output stream that is adjusted to the viewing position.

The media device, which may be a local device or a remote device, such as a server, uses the plurality of media streams to generate the output stream in order to reflect a current viewing position associated with the output device, which may be explicitly or implicitly set by a viewer or user operating the output device. For example, the user may move himself and/or the output device and the output stream is adapted to the motion such that a motion parallax is reflected in the output stream. The viewing position may correspond to a device position. However, the viewing position may also reflect a position of the user, the user's head, or the user's eyes. The viewing position may also be determined based on a position of the user relative to the device.

Humans and animals actively use motion parallax, in which the head moves to gain slightly different viewpoints in order to estimate distances and depth of objects in a scene. For example, a human looking to a foreground object and moving his head may experience that the position of the foreground object shifts with respect to a background when the viewer moves. The motion parallax effect is clearly noticeable even with very small head displacements in the order of millimeters. It is difficult to keep a human's head so still that the motion parallax effect entirely disappears. The motion parallax effect is typically used by the visual perception system of humans and animals as a further source of information to reconstruct a three-dimensional environment. Hence, by continuously adapting the output stream to a current viewing position, a more immersive experience of the media is enabled.

The plurality of media streams are captured by a plurality of cameras of at least one array of cameras. The cameras may be spaced apart, such that they may capture a scene from different viewpoints that can be taken into consideration during generation of the output stream for the current device position. One skilled in the art will understand that this cannot be achieved by a single camera even with a very large viewing angle because such single camera fails to provide media streams from different viewpoints that are, however, required to reflect a change in the viewing position. Media captured by a single camera may only allow for an adaption with regard to a viewing orientation. The media device according to the present disclosure enables generation of an output stream of a captured scene based on a viewing position, which takes into account the motion parallax effect and thereby generates a realistic experience of a captured scene.

The media streams may include captured video data with or without audio. Accordingly, the array of cameras may include means for sound acquisition that may be arranged in a phased array in order to determine a spatial origin of a recorded sound.

In a preferred embodiment, the input interface is further configured to receive a viewing orientation associated with the output device and the processor is further configured to generate the output stream adjusted to the viewing position and viewing orientation. The cameras of the at least one array of cameras may capture a scene into individual media streams from different viewpoints and may further be arranged to cover a large viewing angle, which may enable a viewer to both, look around to view the captured scene from different perspectives as well as move around to perceive the scene from different viewpoints. This leads to a further improved immersive experience of the captured content based on a large viewing angle and a realistic motion parallax. The viewing position and viewing orientation may refer to a position and orientation of the viewer's body, the viewer's head, the viewer's eyes or even individual eyes of the viewer, which may be related to a current device position and device orientation of the output device. For example, the viewing orientation may enable a determination of a gaze of the viewer, either of both eyes or of each eye individually, which may be used to determine a position on the output device or a position within the captured scene the user is looking at in order to further adjust the generation of the output stream based on the viewing orientation, such as applying foveated rendering optimizations. This may further enable an adaptation of the output stream to the gaze of the viewer.

Preferably, the output stream may be provided as a stereoscopic stream. A stereoscopic stream may provide individual output data for the left and the right eye of the viewer. The separation of the individual streams for the left and the right eye, respectively, may be achieved by hardware means, such as using individual displays for the left and the right eye, for example using head-mounted displays, or by using filtering techniques, wherein both streams for the left and the right eye are displayed simultaneously or in an interlaced fashion on a display device and filtered by individual filters, such as polarization filters or color filters for the individual eyes, or by using shutter glasses and the like. Furthermore, autostereoscopic displays could be used. Hence, a user may experience a full stereoscopic representation of a captured scene and may further adapt a viewing position and orientation by changing a position and orientation of the output device, for example by moving a tablet in relation to his or her head or by directly moving and rotating a device attached to the head, such as a head-mounted display or respective glasses, by moving and rotating the head. This leads to an immersive and realistic experience of a captured scene which takes into account stereopsis, motion parallax and a large viewing angle. The separate left and right eye streams may be obtained from different individual cameras in the array spaced apart at a suitable distance.

Preferably, at least some of the cameras of the at least one array of cameras may be configured to obtain depth information of a captured scene. Non-limiting examples are Time Of Flight cameras, Structured Light cameras, Lidar scanners, Radars and Sonars. These cameras can provide X, Y, Z information of the scene in the form of a point cloud. The depth information may have a lower resolution. The obtained depth information can subsequently be combined with depth determination algorithms that use visual data from the at least one array of cameras like for instance stereopsis, triangulation, optical flow, SLAM and others in order to accurately construct depth maps of the scene.

In yet another embodiment, to generate the output stream the processor is configured to determine at least one media stream of the plurality of media streams based on the viewing position and viewing orientation and generate the output stream based on the determined at least one media stream using the viewing position and viewing orientation. Preferably, the viewing position and orientation may define a (viewing) perspective relative to the output device and the at least one media stream may be determined according to the perspective. For example, by rotating and moving his head, a user may adjust a viewing position and viewing orientation with regard to a captured scene, thereby defining a different perspective. The parameters of the perspective, such as the viewing position, the viewing orientation and/or viewing angle(s) may be taken into consideration to determine at least one media stream of the plurality of media streams that may have been captured using a camera of the at least one array of cameras with a suitable field of view or camera perspective, such as at least one of a suitable camera position, camera orientation and/or viewing angles of the camera.

In a preferred embodiment, two or more media streams are determined and the output stream is generated by processing the two or more media streams according to the viewing position and orientation. Processing the media streams may include one or more of Warping, Stitching and Interpolating the two or more media streams. The processing may be a more complex reconstruction process based on the input stream data. For example, the processing may rely on a combination of standard image reconstruction techniques, such as stitching, warping, interpolation and extrapolation. For example, extrapolation may be needed in areas where no or limited (visual) information is available based on the available media streams, in order to fill up blanks or holes in the media data. However, it is to be understood that the reconstruction process is not limited to computer vision techniques and may further take into consideration spatial data about the scene, which may include one or more of reconstructed 3D geometry information, parameters about materials, and a light field, which may correspond to a flow of light in the captured scene, and the like, in any combination. The spatial data may be used to re-render the captured scene with 3D rendering techniques. Preferably, in one or more embodiments, the generation of the output stream may include using a deep learning technique and/or neural networks that could be applied to recreate images or frames of the output stream from a sequence of images or frames of the media streams of the same scene taken from different viewpoints. This may enable a complex reconstruction and generation of the output stream even if at least a part of the scene is not captured completely or in full detail. Preferably, the two or more media streams may be determined as the n nearest media streams according to the perspective of the output device. Accordingly, the perspective of the output device including a viewing position, viewing orientation and/or viewing angle(s) may be compared to a field of view or perspective of each camera of the at least one array of cameras in order to determine the two or more media streams that may be closest to the perspective of the output device. Based on the (orientational or positional) offsets of each camera's perspective and the perspective of the output device, weighting parameters can be calculated that may be used to process the respective output stream.

In one embodiment, the plurality of media streams may be further processed such that the quality of the output stream is focused to a position where the viewer is actually looking at, such as based on a determined gaze direction, or in the center of a frame. Furthermore, the media streams may be processed in order to enable predicted motion reconstruction or to futurepolate the media streams, including a prediction where the viewer is going to look at next and reconstructing this area in advance. Furthermore, additional processing may be applied that takes into account the focusing distance of the eyes (for instance determined by the relative position and orientation of the pupils) to further improve the quality and fidelity of the output streams. Non limiting examples are focusing distance dependent shift and parallax effects as well as defocus blurring of those parts of the scene that can be determined to be out of focus for the viewer.

According to the present disclosure, the terms perspective or viewing perspective may be used throughout this disclosure to determine a viewing position, viewing orientation, viewing angle(s) and/or a field of view of both, the capturing cameras, the output device as well as of a user or viewer, such as a position and orientation of the viewer's body, the viewer's head, the viewer's eyes or even individual eyes of the viewer.

In one embodiment, each camera captures the respective media stream according to camera parameters, including a camera position and orientation in the at least one array. The camera parameters may further include information about a viewing angle in both horizontal and vertical directions.

Hence, the camera parameters may be used to calculate a field of view or perspective of the scene as captured by the camera. Accordingly, the camera parameters may be compared with the viewing position and viewing orientation defining the perspective for the output device in order to determine one or more suitable cameras providing respective captured media streams to generate the output stream reflecting the perspective of the output device.

Preferably, each array of cameras is configured to capture a scene, each camera of the array being configured to capture at least a part of the scene according to the camera parameters.

Preferably, the plurality of media streams may be provided by a plurality of arrays of cameras, wherein each array may be oriented and spaced apart from another array according to a particular angle and offset in order to cover a larger viewing angle of the captured scene and/or to provide possibly partially redundant captured data of the scene from different camera perspectives to improve the quality of the resulting output stream.

In yet another embodiment, the two or more media streams are determined as the n nearest media streams according to a perspective of the output device and parts of the scene captured by the camera in the media streams. Accordingly, the camera parameters determining a part of the scene captured by the camera may be compared to the perspective of the output device in order to establish a plurality of most suitable media streams for generating the output stream.

The media streams may be pre-recorded media streams. Preferably, at least a part of the plurality of media streams are pre-recorded media streams. Hence, the approach according to embodiments of the present disclosure allows for capturing of a scene or of a plurality of scenes, for example in a movie or a film, which can be reproduced with a correct motion parallax without requiring any further or subsequent capturing or recording of the scenes.

In yet another embodiment, the plurality of media streams may be live media streams. Preferably, at least a part of the plurality of media streams are live media streams. The live media streams may be recorded by the array of cameras and directly transmitted for remote viewing. The output stream can be adjusted by a viewer by influencing the viewing position (and/or orientation) related to the output device. Similar to pre-recorded media streams, the live media stream does not require a further capturing or recording of the scene to enable a correct motion parallax.

In yet another embodiment, the processor is further configured to combine the output stream with at least one computer graphics object.

Preferably, the device may further comprise an engine communicatively coupled to the processor, wherein said engine may be configured to provide the at least one computer graphics object according to the viewing position and/or orientation. Since the media streams capture the scene from different perspectives, they may be further analyzed with regard to a depth of the objects in the scene using optical flow techniques. The depth information may enable rendering of three-dimensional computer graphics objects into the output stream which may take into account the depth of the surrounding objects. Furthermore, the availability of the depth information of the scene may enable the reconstruction of 3D sets by means of photogrammetry. A 3D model can be reconstructed from the video data whereby the textures and materials used for the 3D model are extracted from the scene. The depth information can furthermore be used to enhance the image contrast of video obtained in fog or haze.

Preferably, at least one of the cameras of the at least one array of cameras may include means for capturing depth in the captured scene, Non-limiting examples of cameras providing depth information are Time Of Flight cameras, Structured Light cameras, Lidar scanners, Radars and Sonars. Unlike normal cameras these cameras provide directly the X,Y,Z values of the scene. The depth information may further be used to embed the computer-generated objects within the output stream, thereby generating a realistic composition of computer-generated media and captured media, to reconstruct a 3D model from the scene, to enhance the image contrast of video obtained in fog or haze and so on.

The skilled person will understand that the array of cameras may be used to capture real scenes, such as a real environment including real objects and subjects. However, the array of cameras may also represent a virtual array of virtual cameras that can be used to capture a virtual, computer-generated scene.

Preferably, the plurality of media streams may capture different real and/or computer-generated virtual scenes, which may be combined or further composited in real-time with computer-generated objects to generate a final enhanced output stream. This greatly improves provision of highly realistic and immersive composited media.

In yet another embodiment, the processor is further configured to generate from the plurality of media streams a plurality of output streams based on the viewing position and orientation, wherein each output stream reflects the viewing position and orientation adjusted by an offset. Hence, the processor may speculatively generate the plurality of output streams for likely next movements of the output device or the viewer. Preferably, according to a current viewing position and orientation of the output device, the processor is further configured to warp and stitch between the plurality of output streams to an output stream nearest to the current viewing position and orientation of the output device. This may enable a faster response and reduction of latency due to computation of the output stream.

In yet another embodiment, the processor is further configured to decode the plurality of media streams, wherein at least some of the plurality of media streams are compressed based on another one of the plurality of media streams. Accordingly, the plurality of media streams may be compressed in an efficient way by using the parallax effect itself. Hereby, the motion vectors derived with standard motion detection techniques may correspond to actual parallax shifts between neighboring media streams. They may describe the shifts of image blocks seen when comparing one video image to a video image from a neighboring or adjacent camera in the array of cameras. Hence, only the (generally small) differences between a (vector) block in one image and a corresponding shifted block in an image from an adjacent or neighboring camera can be encoded. Accordingly, the transmission bandwidth, resources and storage space may be greatly reduced. This encoding may also account for image data seen in one image but not seen in another image from an adjacent or neighboring camera, for example, due to occlusion by a foreground object. Accordingly, the plurality of media streams may also be regarded as a single stream that may contain captured media from a plurality of cameras.

In yet another embodiment, the input interface is further configured to receive a plurality of viewing positions, each associated with an output device, and wherein the processor is further configured to generate from the plurality of media streams a plurality of output streams, each reflecting a respective viewing position. Preferably, the input interface is further configured to receive a plurality of viewing orientations, each associated with one of the plurality of output devices, and wherein the processor is configured to generate a plurality of output streams, each reflecting the respective viewing position and orientation. Accordingly, the captured scene may be provided to a plurality of output devices, wherein for each output device, the correct motion parallax is taken into account.

In yet another embodiment, the device further comprises an output interface configured to transmit the output stream or the plurality of output streams to the output device or to respective output devices.

According to another aspect of the present disclosure, a camera device comprises at least one array of cameras being configured to provide a plurality of media streams, each media stream being captured using a camera of the array of cameras, wherein the plurality of media streams are provided to generate at least one output stream adjusted to a viewing position associated with at least one output device.

In one embodiment, the at least one array of cameras includes one or more cameras that are focused on specific distances of a range of distances, wherein said one or more cameras are configured to capture at least some or all parts of the scene in sufficient focus. Alternatively, a single camera sensor of the one or more cameras may be equipped with an array of lenses projecting the scene multiple times on separate parts of the sensor with different focusing distances. Other types of cameras that are configured to capture the scene with a focus on specific distances may also be used and the present disclosure is not limited by a particular type of focus of a camera.

In one embodiment, the at least one array of cameras includes at least one lens with an ultra-wide angle. The array of cameras may include a fish eye lens. Preferably, each camera may be equipped with a fish eye lens that may be able to capture a wide viewing angle, such as 180°. Additionally or as an alternative, the array of cameras may be equipped with a single large lens with an ultra-wide angle, such as a large fish eye lens for the entire array of cameras. This could be used to capture an angle of more than 180° and avoids configuration of individual cameras with additional lenses. It is to be understood, that even though a camera may capture a media stream with a wide viewing angle, the resulting output stream may include a subrange of the viewing angle only in order to represent a normalized field of view on the output device. In particular, the media streams representing a wide viewing angle can be further processed using image processing and geometry processing techniques and interpolated with other respectively processed media streams to generate the output stream.

In a preferred embodiment, at least one camera is a stereoscopic camera. Accordingly, the stereoscopic camera may provide a media stream including two components which are recorded using an offset. Hence, the first component of the media stream may be recorded according to a first camera position and camera orientation and the second component of the media stream may be recorded using the same camera orientation, however, a camera position which is offset to the camera position of the first component. Hence, the two components of the media stream can be regarded as two separate media streams and may be used for further generation of the output media stream. This may increase the number of available media streams by using stereoscopic camera hardware.

In yet another embodiment, at least one camera is a camera configured to capture depth information. It is to be understood that depth information may particularly be used to further composite the captured media stream with computer-generated objects. However, depth information could also be used to improve compression of the plurality of media streams. Depth information needs not to be captured by each camera. Rather, a subset or even a single camera of each array of cameras may capture depth and/or be optionally equipped with a depth sensor.

In yet another embodiment, the camera device further comprises a processor configured to encode the plurality of media streams, wherein at least some of the plurality of media streams are compressed based on another one of the plurality of media streams. The encoding may exploit spatial similarities in media streams captured by neighboring or adjacent cameras of the array of cameras, which may greatly reduce the size of the captured plurality of media streams, while preserving the full information for representing the output streams with a correct motion parallax.

According to yet another embodiment, the cameras of an array are arranged on a surface according to a pattern. Each camera may capture at least a part of the captured scene according to a viewing position and orientation of the camera as defined by the pattern. The cameras may be arranged on the surface according to a regular pattern in a regular or equidistant manner. The pattern may also be regarded as an array form factor.

In a preferred embodiment, the surface is a curved surface. For example, the surface may be a concave or convex surface. Based on a configuration of the surface, the camera device may be adapted to better capture motion parallax of near or far objects.

In yet another embodiment, the camera device comprises two or more arrays of cameras, wherein the arrays are rotated with respect to each other by a pre-determined angle. For example, the two arrays may be spaced apart and rotated by 30°, 45°, 60°, 90°, 115°, 120° or 135°. For example, the camera device may comprise three arrays of cameras that may be rotated with respect to each other by 120° to cover the entire circumferential view of 360°. Similarly, the camera device may comprise at least four arrays of cameras, being rotated with respect to each other by 90°. Likewise, the arrays of cameras may be arranged according to a geometric form, such as a cube, pyramid or on one or more sides of any other polyhedron, such as a regular tetrahedron, a icosidodecahedron, a rhombic tricontahedron, an octagonal prism or any other regular or semiregular polyhedron.

According to yet another aspect, an output device comprises at least one display configured to display at least one output stream, and means to detect a viewing position associated with the output device, wherein the at least one output stream is generated from a plurality of media streams, each media stream being captured using a camera of at least one array of cameras, wherein the output stream is adjusted to the viewing position.

Preferably, the detection means may also detect viewing orientation associated with the output device and the viewing orientation and position may be used to generate the output stream for display on the output device. The detection means may detect a position and orientation of the viewer and/or a position and orientation of the output device, which can be combined in order to determine the viewing position and/or viewing orientation. The position and orientation of the viewer may be tracked or captured at various levels, such as tracking a position and/or orientation of the body of the viewer, of the head of the viewer, of the eyes of the viewer, or of individual eyes of the viewer (eye tracking), in any combination, in order to determine a suitable viewing position and/or viewing orientation. For example, the output device may be a head-mounted display and the detection means may include a head tracker in order to determine the head's position and orientation to derive the viewing parameters. However, the output device may further be equipped with an eye tracker in order to determine a viewing position and/or viewing orientation of each individual eyes that may be used to adjust the output stream for the individual eyes. In yet another example, the output device may be a large TV set including an optical tracker that may be used to track a position and orientation of the head of the viewer in relation to the TV screen. Hence, the relative position and orientation of the viewer with regard to the TV screen may be used to derive the viewing position and/or viewing orientation. Also in this example, the output device may be, additionally or as an alternative, equipped with an eye tracker to determine a position on the TV screen where the viewer is looking at. It is to be understood that the detection means may include any kind of technology suitable for determining a viewing position and orientation to enable a correct reconstruction of the output stream to be provided on the output device.

The output stream may be generated by a (media) device according to another aspect or embodiment of the present disclosure. However, the (media) device may also be integrated in the output device, such that the output device may be configured to receive the plurality of media streams and further to process the plurality of media streams to generate from the plurality of media streams the output stream adjusted to the current viewing position and/or viewing orientation of the device.

In yet another embodiment, the output device further comprises an interface configured to receive a plurality of output streams, each output stream reflecting a viewing position and/or viewing orientation, wherein the output device is configured to warp between the plurality of output streams according to a current viewing position and/or orientation. This may reduce the latency of providing a correct output stream for a current viewing position and/or orientation if the output stream is generated on a remote entity.

Preferably, the output device may be a user display device, which may be connected to a network for receiving the plurality of media streams and/or the at least one output stream. Furthermore, the output device may include storage for storing the plurality of media streams or reading the plurality of media streams from a storage, such as a hard disc, DVD or Blu-ray Disc. Accordingly, the output device may also be a personal computer, a set-top box or a console which may be connected to a display and which may comprise the means to detect a viewing position and/or orientation associated with the output device. The output device may also be a wearable device, such as a head-mounted display or computerized glasses, which may adjust the viewing position and/or orientation directly based on a movement of the head or of the eyes of the user.

According to yet another aspect, a system comprises a device according to one or more embodiments of the present disclosure, wherein the device is coupled to at least one camera device according to another embodiment of the present disclosure, and/or to at least one output device according to one embodiment of the present disclosure.

According to one aspect a method for generating output streams for presentation on output devices is defined including the steps of providing a plurality of media streams, each media stream being captured using a camera of at least one array of cameras, receiving a viewing position associated with an output device, and generating from the plurality of media streams an output stream adjusted to the viewing position.

According to preferred embodiments, the method may comprise processing steps, which may be defined as functionality of devices according to embodiments of the present disclosure, in any combination.

According to yet another aspect, a computer-readable medium is provided, which can be a tangible computer-readable medium, that may store instructions thereon, which, when installed and/or executed on a computing device, cause the computing device to perform a method according to one or more embodiments of the present disclosure. The computing device may be a camera device, a media device or an output device according to one or more embodiments.

Devices according to embodiments of the present disclosure may be implemented in hardware including one or more processors and memory for storing instructions and data that may be processed by the one or more processors to provide media streams and/or to generate and/or to render output streams according to embodiments of the present disclosure. Furthermore, the media, input and output interfaces may be implemented as software interfaces, as hardware interfaces or as a combination of both enabling exchange of respective data, such as hardware interfaces to the processor and/or respective APIs providing data, such as communication buses network interface, I/O interfaces, respective protocols and the like.

BRIEF DESCRIPTION OF THE DRAWINGS

The specific features, aspects and advantages of the present disclosure will be better understood with regard to the following description and accompanying drawings where.

DETAILED DESCRIPTION

In the following description, reference is made to drawings which show by way of illustration various embodiments. Also, various embodiments will be described below by referring to several examples. It is to be understood that the embodiments may include changes in design and structure without departing from the scope of the claimed subject matter.

Figure 1:
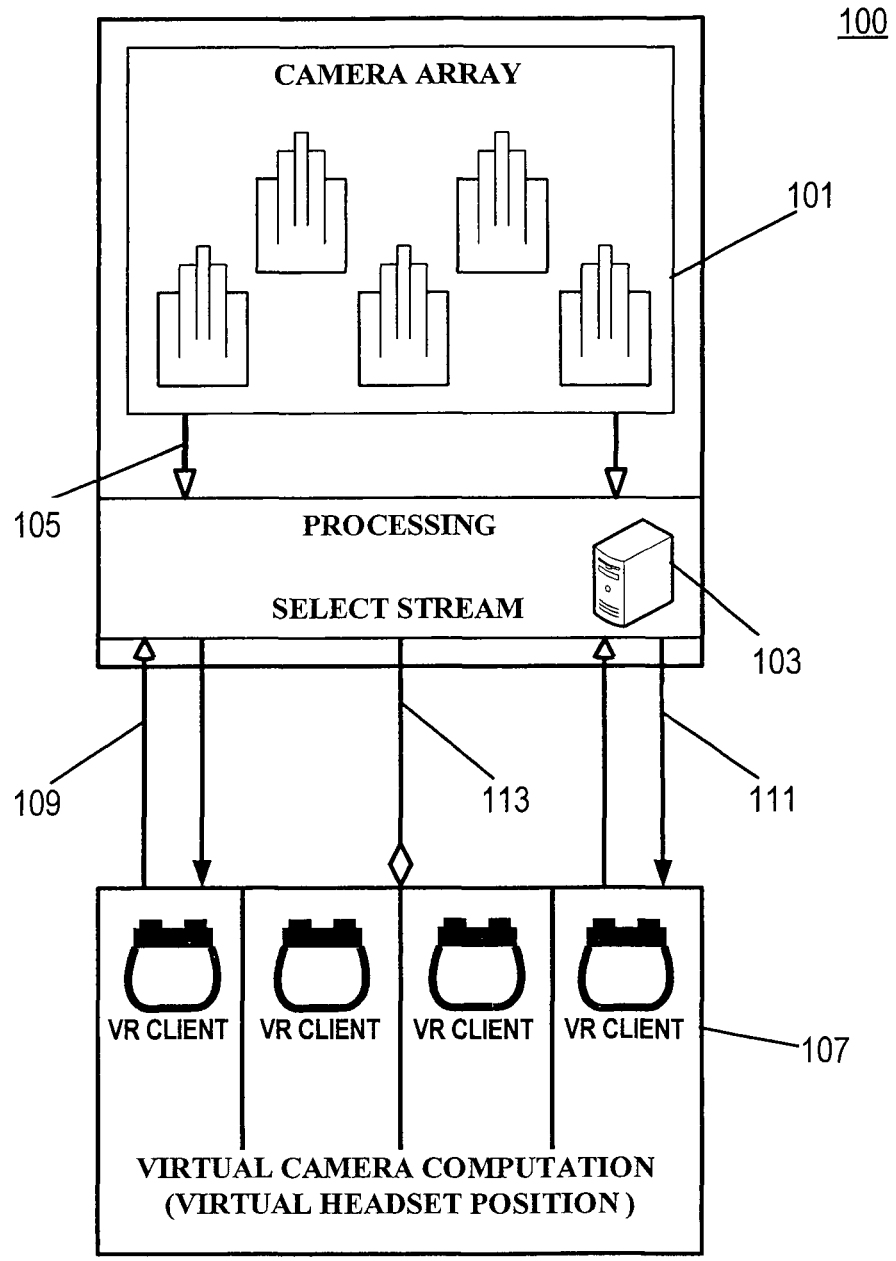
FIG. 1 shows a system according to one embodiment of the present disclosure.

FIG. 1 shows a system according to one embodiment of the present disclosure. The system 100 includes a camera device 101 with a plurality of cameras arranged in a camera array. The camera array may be a two-dimensional array of cameras or camera sensors, wherein the shape of the array can be a flat surface or a curved surface in order to provide a desired viewing angle, such as a large viewing angle, which may be required for virtual reality (VR)/augmented reality (AR) applications. The camera device 101 may provide a plurality of media streams to a processing device 103 via interfaces 105. The processing device 103 may be configured to process the plurality of media streams and to generate respective output streams that reflect a viewing position and orientation associated with output devices.

As shown in FIG. 1, the processing device 103 may be connected to a plurality of output devices 107, which may be a plurality of virtual reality or augmented reality clients, such as VR headsets. Each VR headset may provide their current positional and orientational data including a current viewing position (three coordinates) and a current viewing orientation (three angles) to the processing device 103 using interfaces 109. The processing device 103 may then, based on the received viewing position and viewing orientation of each output device 107 generate an output stream with a correct motion parallax for each individual output device 107 and may then send the correct output stream to each output device 107 via interfaces 111.

The correct output stream may be interpolated from the plurality of media streams provided by different cameras of the camera array 101 in order to allow the correct parallax effect for arbitrary head displacements in a continuous fashion.

As an alternative, the processing device 103 may generate a plurality of output streams and may provide via interface 111 further information that indicates, which output stream should be selected by a particular output device 107 for display. The selected output stream may, as an alternative, be pulled over interface 113.

As yet another alternative, the output device 107 may interpolate the output stream from multiple media streams coming from individual camera sensors of the camera array over interface 113, where the interpolation may be based on parallax shift vectors detected in the media stream. Each output device 107 may display an output stream which reflects a correct motion parallax according to a current viewing position of the output device 107 and/or viewing orientation of the output device 107 to enable a further realistic exploration of the captured scene.

The processing of system 100 provides for an improved immersive experience of captured content by taking into account visual processing principles of humans.

A realistic immersive 3D graphics experience mandates high quality, geometrically correct display of information. In humans, incoming visual information from both eyes are taken into consideration in order to reconstruct a correct three-dimensional geometry of the surrounding world. Hence, any display technology designed to present three-dimensional images to the eyes, either artificially generated images or images obtained from cameras, need to take into account the visual processing principles. Incorrect three-dimensional images may confuse the visual processing and may result in a feeling of unnaturalness that may reduce the quality of experience. It can even be a source of dizziness, such as motion or simulator sickness for the viewer.

One of the principles for obtaining three-dimensional geometry is stereopsis since the eyes of humans and animals are in different positions on the head. Hence, they represent different views simultaneously. Stereopsis exploits the different views from the eyes to gain depth perception and estimate distance to objects. Humans and animals also actively use motion parallax, in which the head moves to gain different viewpoints. The skilled person understands that even though stereopsis could be used to provide depth perception, motion parallax is independent of stereopsis and even applicable with display of media for a single eye only. For example, by looking, with one closed eye, to a foreground object, it can be perceived how the position of the foreground objects shifts with respect to the background when the head moves. This effect is clearly noticeable even with very small head displacements in the order of millimeters. It is in fact quite difficult to keep the head so still that the motion parallax effect entirely disappears. Under normal viewing conditions, the motion parallax effect will always occur and will be used as a source of information to reconstruct a three-dimensional geometry. Even when a viewer rotates his or her head in order to view a different part of a scene, the relative position of the eyes changes and a significant motion parallax effect occurs. This effect cannot be taken into consideration by existing camera systems with a large viewing angle.

Conflicting information may therefore be sent to the brain by stereoscopic display systems which do not take motion parallax effects into account. The situation may even be aggravated in more immersive display systems, like, for example, virtual reality, head-mounted displays, AR glasses or headsets. With these systems, the viewer can rotate his head over a very large angle, from left to right, upwards or downwards, and roll the head to the left and to the right. Hence, in order to provide an immersive experience, the display system may be required to provide the correct images regardless of whatever direction the viewer is looking to.

Even though existing stereoscopic fish eye lens cameras can be used to record stereoscopic movies, they do not take into consideration the motion parallax effect that occurs when a viewer moves and/or rotates his or her head by larger angles, in particular, to take advantage of the fish eye lenses large field of view. As a result, a display system for recorded movies based on such stereoscopic fish eye lens cameras will inevitably provide conflicting information to the brain with a loss of quality of the immersive experience.

Viewers, especially those using virtual reality viewing equipment such as virtual reality headsets, will have a natural tendency to move their head to look from a different viewing position to a scene directly in front of them. For example, an object may be hidden when looking from one position while it may become visible, due to the parallax effect, when looking at it from another position. The present disclosure, therefore, enables live or pre-recorded media that take motion parallax information into account.

As shown in FIG. 1, when a pre-recorded or live media is later presented to an audience, where each one in the audience may wear its own VR headset, such as the output devices 107, then it is desirable to take into account the actual viewing direction of each member of the audience as well as the relative head location of each member of the audience so that each individual viewer can be served with an output stream including the right images with the right parallax information.

Even though the system 100 of FIG. 1 is shown as including a camera device 101, it is to be understood that the processing device 103 may also process pre-recorded and respectively stored media streams, such as a plurality of media streams directed at a pre-recorded three-dimensional movie. Hence, the pre-recorded three-dimensional movie may be provided to a viewer or an audience of viewers in such a way that the motion parallax effect is correctly taken into consideration in order to avoid conflicting perception of depth information from stereopsis on the one hand and motion parallax on the other hand.

Rather, the output streams provided by the processing device 103 may provide individual users with the illusion that he or she is actually present in the pre-recorded three-dimensional movie. The visual information provided to him or her will depend on his or her head position and orientation, which may define a viewing position and viewing orientation that are used by the processing device 103 to generate an output stream with a correct motion parallax effect that may accompany the stereoscopic images. However, it is to be understood that the correct motion parallax does not depend on stereoscopic image processing and may also be provided for non-stereoscopic media streams.

The camera device 101 may include a two-dimensional array of cameras or camera sensors or a plurality of two-dimensional arrays of cameras or camera sensors. The camera device 101 may be configured for virtual reality (VR) or augmented reality (AR) applications and may have a very large field of view, such as 180° or more, so that a viewer can observe the scene from any direction by turning his head to the left, right, up or down or rolling the head to the left or to the right, as well as by moving the head in all three directions. Such a wide field of view may be achieved by a specific array form factor, using either a curved shape for the array or a flat shape with a plurality of two-dimensional arrays. The viewing angle can optionally be enlarged in combination with specialized lenses for wide viewing angles, for instance each camera sensor in the array could be equipped with a fish eye lens that may be able to capture a viewing angle of approximately 180°. The view presented to the viewer can be a subrange of this viewing angle, for example 90° to 120° selected from the total of approximately 180° captured viewing angle, depending on the viewing direction of the viewer. In this particular example, the viewer can rotate his or her head by 35° to 45° before reaching a boundary of the captured scene or parts of the scene outside of the visible area. Another option to achieve a very large viewing angle may be to use a large fish eye lens for an entire array of cameras, as described further below with regard to FIG. 4. This alternative would be able to capture more than 180° and avoid that individual sensors occlude the scene from each other at approximately 180°. Accordingly, the two-dimensional array of the camera device 101 may provide parallax information for horizontal as well as vertical head displacements. By using a plurality of two-dimensional arrays motion parallax for movement of the head to the front and to the back may be achieved as well.

Media data recorded by the camera array of camera device 101 can be stored and may afterwards be used at any time to provide a viewer using a respective output device 107, such as a VR headset, video glasses or TV sets with respective tracking hardware, with the output stream including media that would be seen from an arbitrary viewing position and arbitrary viewing orientation. The maximal head displacement and the maximal viewing angle may be limited only by the size and shape of the two-dimensional array(s) of the camera device 101.

The output devices 107 may be equipped with sensors to determine a relative position of the output device or headset (three coordinates) as well as a relative orientation of the headset (three angles) with regard to the viewer. This tracking information amount to 6 degrees of freedom for the output device that may determine how the output stream will be generated from the plurality of (prerecorded) media streams.

According to one embodiment, motion vectors between media streams from any two-by-two set of adjacent or neighboring cameras or camera sensors can be advantageously used to interpolate the parallax shifts for an output image that would come from a (virtual) camera or camera sensor position located on any intermediate position on the camera array. This may allow for a calculation of output images with a parallax effect for any intermediate head displacements.

The quality of the determination of the motion vectors can be further improved with additional image sensors that may provide per pixel depth information. In this case, the motion vector describing the parallax effect can be calculated from the normal images of the media stream using optical flow techniques or any other suitable technique, as well as from the depth information, which could be checked for correspondence or which could be used to improve the resulting motion vectors. In case of a discrepancy various approaches could be used, such as using confidence levels, to choose the motion vector of one of the two, or to average the motion vectors of the two or to apply another mitigation strategy.

The plurality of media streams provided by the camera device 101 may be compressed. The media streams may comprise video streams, which may either be temporarily compressed similar to a single video stream or which may be compressed spatially, where each video stream is compared to a spatially adjacent video stream of an adjacent or neighboring camera or camera sensor of the camera device 101. The relative motion vectors and remaining difference data may then be encoded in the media stream. Hence, based on a pivot media stream, which may correspond to a media stream captured on a center of the camera array of the camera device 101 the remaining media streams may be encoded as difference media streams. This may greatly reduce the required bandwidth and further reduce the required storage capacity. The motion vectors and remaining difference data may be determined using standard motion detection techniques or any other suitable technique.

In yet another embodiment of the system 100, each of the individual VR clients may receive the plurality of data streams from the plurality of cameras or camera sensors of the camera array of camera device 101 that may be compressed in one single data stream using the previously described spatial compression method. Each individual VR client may have logic that, using its own viewing position and orientation (6 degrees of freedom) may be configured to extract, decompress and interpolate the media data according to the viewing position and orientation to generate the output stream in order to provide a seamless virtual view. Hence, the processing device 103 may be incorporated in each output device 107 (VR client). A single compressed data stream may serve multiple viewers utilizing output devices 107 and may, therefore, greatly reduce the required bandwidth if many viewers are to be served simultaneously.

In yet another embodiment of system 100, the processing device 103 may know for all output devices (VR clients) the respective viewing positions and orientations (6 degrees of freedom) for each output device 107 (VR device), and may interpolate the plurality of media streams to seamlessly provide output streams for all the output devices 107. In other words, the processing device 103 may transform N media stream from N cameras or camera sensors of the camera device 101 to M video streams for M viewers, which may also be stereo video streams. The M video stream for the M viewers can further be optionally compressed into a single data stream using spatial motion vectors between the M video streams, which are then provided by interface 111 to the plurality of output devices 107. Accordingly, a single compressed data stream to serve multiple viewers can greatly reduce the required bandwidth if many viewers are to be served simultaneously.

This also reduces hardware and logic requirements for each individual headset because the processing device 103 provides, in a single compressed stream, the data needed to reconstruct the output streams for each individual output device 107.

According to one exemplary embodiment, the processing device 103 may provide individual output streams for a number of clients. The number of clients may dynamically change. The number of clients may be compared to a first threshold and if the number of clients exceeds the first threshold, the processing device 103 may switch from providing individual output streams to a single combined stream which may serve the plurality of clients. The number of clients may further be compared with a second threshold and if the number of clients exceeds the second threshold, the processing device 103 may be further configured to provide multiple combined data streams that may each serve up to a number of clients, which may correspond to the second threshold, simultaneously. Hence, the processing device 103 may dynamically react on a current number of clients.

Figure 2:
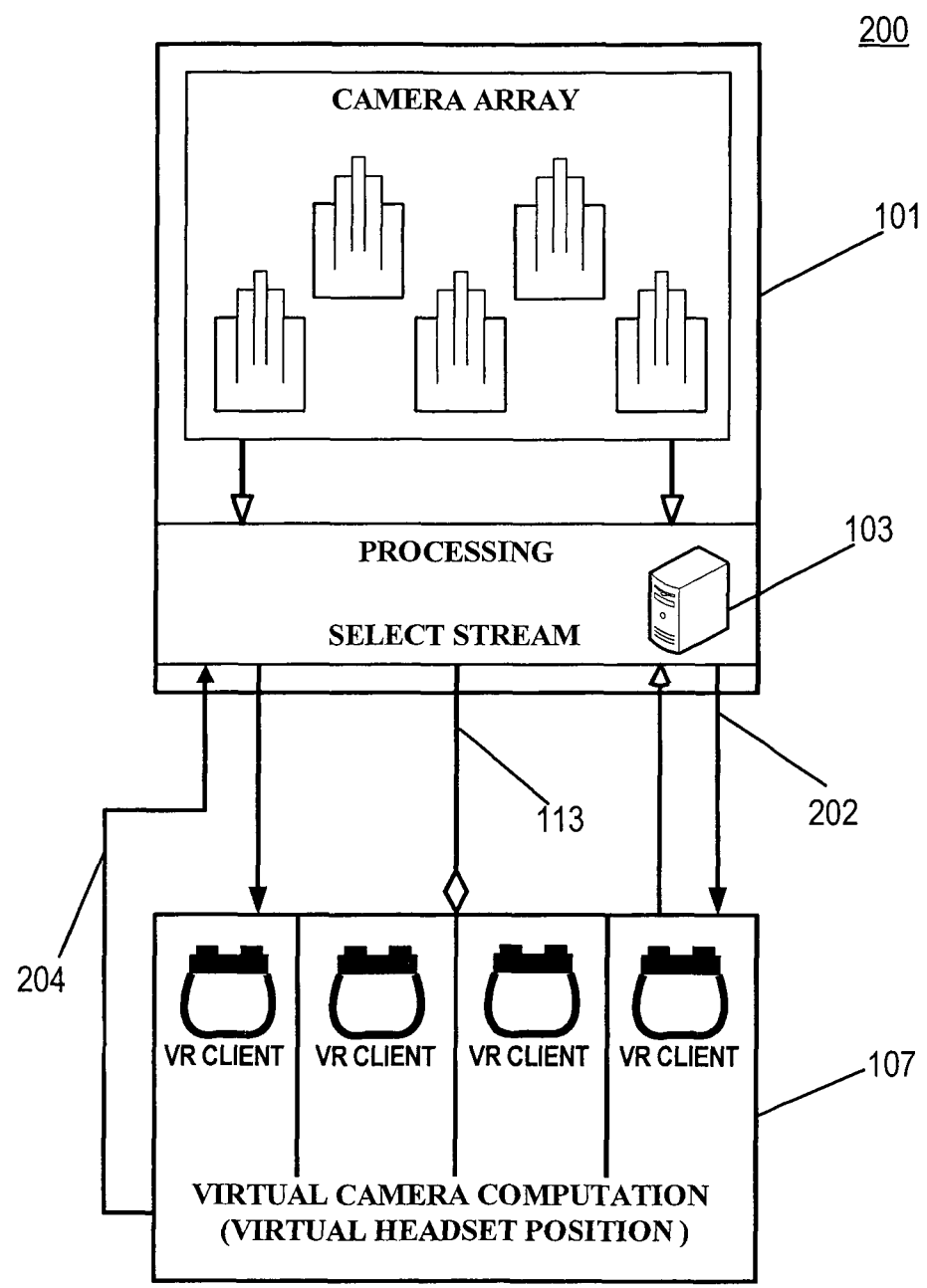
FIG. 2 illustrates another system including a camera array according to one embodiment of the present disclosure.

FIG. 2 shows another system according to one embodiment of the present disclosure. The system 200 may comprise same or similar components as the system 100 shown in FIG. 1. Accordingly, the same reference signs have been used to denote same or similar components.

The system 200 may include a camera device 101 and a processing device 103, which may process a plurality of media streams from individual cameras of a camera array of the camera device 101. The processing device 103 may provide output streams for individual output devices 107 based on a viewing position and/or orientation of the output devices 107, such that each output stream reflects a correct motion parallax.

The processing device 103 may inform the output devices 107 via interface 202, which output streams are available, using metadata. The output devices 107, such as VR clients or VR headsets, may determine their current relative viewing position, for example using three coordinates, and a viewing orientation, for example using three angles, in order to receive a right output stream from the processing device 103 by sending respective information over interface 204. The output devices 107 may then pull a generated output stream from the processing device 103 via interface 113.

Alternatively, the output devices 107 may communicate with the processing device 103, for example via interface 204, which output streams should be selected. The processing device 103 may then push the right output stream over interface 202 to the output devices 107.

Similar to system 100 shown in FIG. 1, the output stream to be displayed on the output devices 107 may be interpolated from a plurality of media streams from the plurality of original cameras of the camera array of the camera device 101 in order to provide the correct parallax effect for arbitrary displacements of the output device 107, such as head displacements in a continuous fashion.

Figure 3:
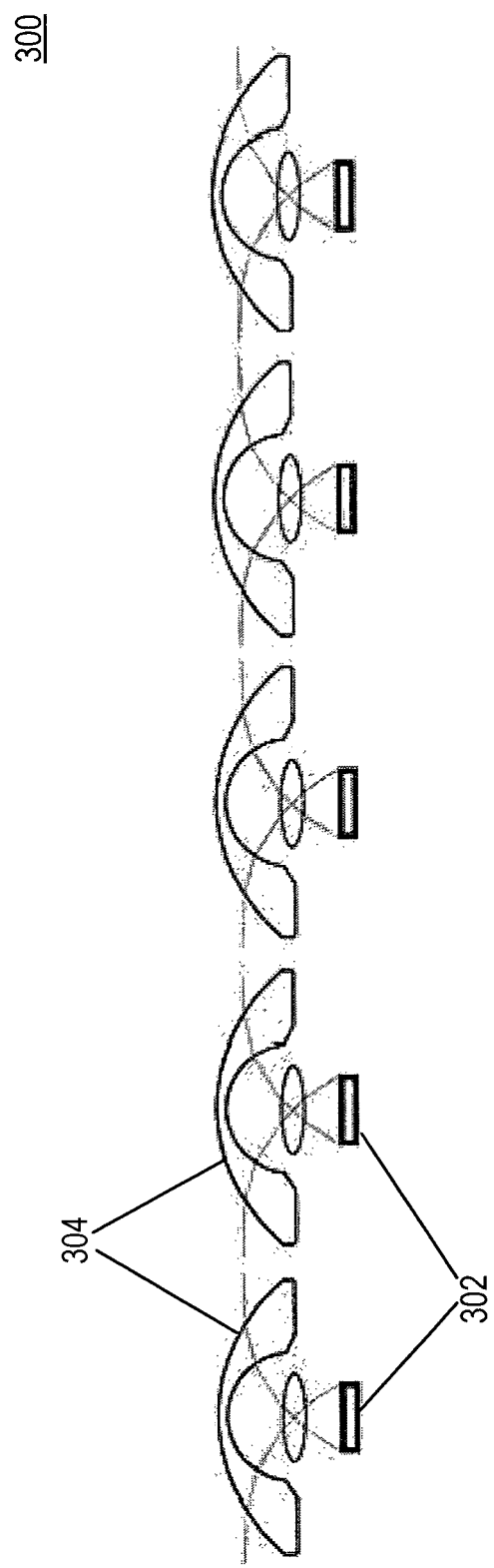
FIG. 3 shows a schematic view of a camera array of a camera device according to one embodiment of the present disclosure.

FIG. 3 shows an arrangement of a plurality of cameras of an array of cameras of a camera device according to one embodiment of the present disclosure. The array of cameras of the camera device 300 may include a plurality of camera sensors 302 with respective optical components. The camera sensors 302 may be equipped with a large field of view lens 304, such as a fish eye lens, in order to achieve capturing of the parallax effect for a large viewing angle, such as up to 180°.

A viewer using a virtual reality/augmented reality headset, such as one of the output devices 107 shown in FIGS. 1 and 2, looking at a movie recorded by the camera device 300 could be presented with a sub-field of a view of, for example, 90° to 110°, so that he can rotate his head by 35° to 45° to the left, right, up and down, to look to other recorded areas within the total of 180°. The headset may detect a current location and orientation of the viewer's head and this information may then be used to reconstruct data for display in an output stream, that may be calculated from selected camera streams, captured by individual camera sensors 302. The viewer, rotating and/or moving his head in any way he chooses, will see the natural rotational and translational parallax effects in all directions. Thereby, an immersive viewing experience is provided.

It is to be understood that the schematic illustration of camera device 300 in FIG. 3 and of devices illustrated in subsequent FIGS. 4 to 8 do not represent a complete optical design. Rather, the camera device 300 and the devices may comprise further optical components, such as components to correct chromatic aberrations and other artifacts. FIG. 3 and subsequent FIGS. 4 to 8 are intended to illustrate and demonstrate the general principle.

Figure 4:
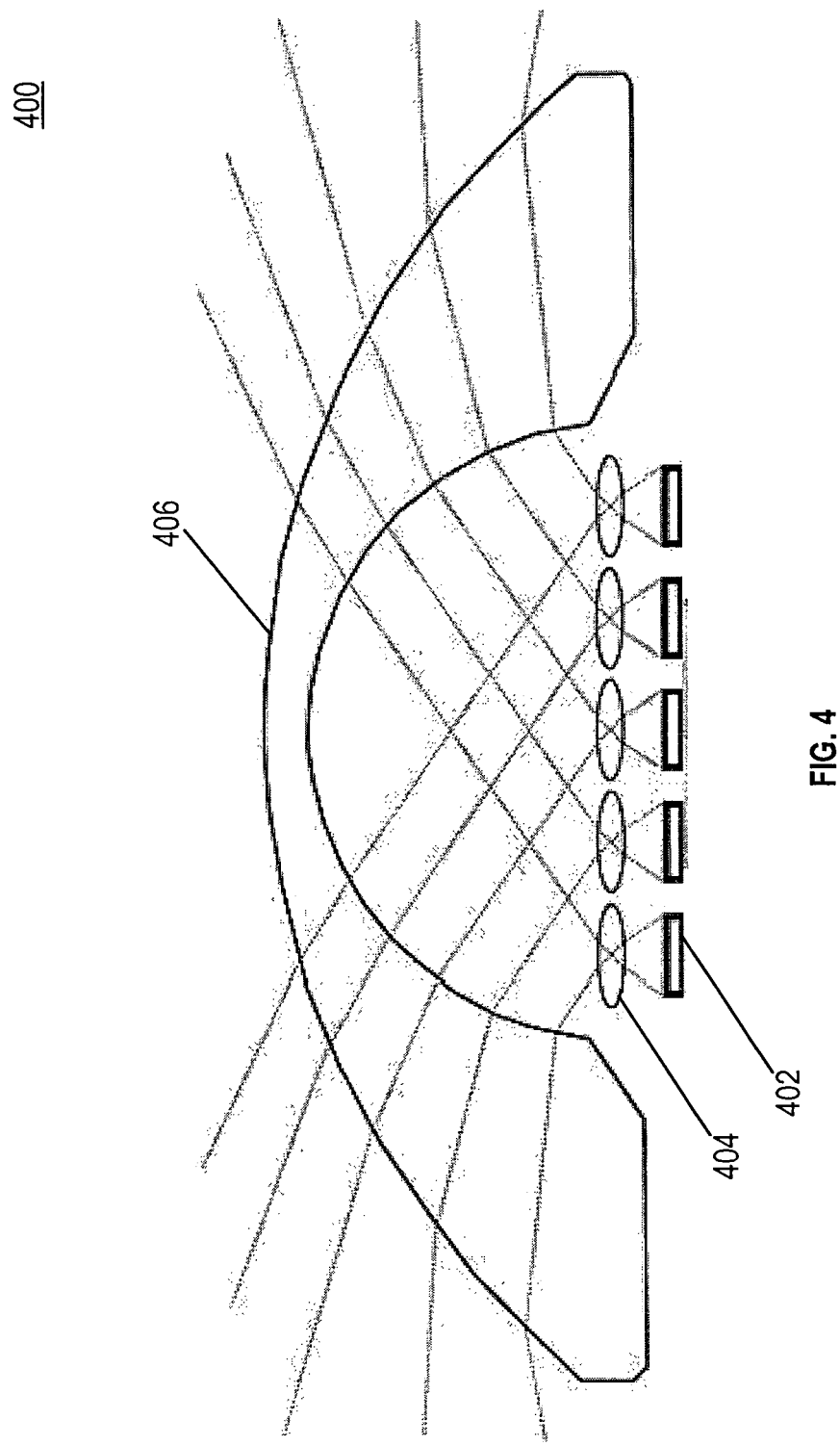
FIG. 4 shows another configuration of a camera device according to one embodiment of the present disclosure.

FIG. 4 shows yet another embodiment of a camera device according to the present disclosure. The camera device 400 may comprise a two-dimensional array of camera sensors 402 with respective optical components 404. The camera device 400 may be equipped with one large fish eye lens 406 for the individual camera sensors 402 in order to achieve capturing of the parallax effect for a large viewing angle, potentially larger than 180°, such as up to for instance approximately 210°.

A user using a virtual reality/augmented reality headset looking at media data recorded by the camera device 400 could be presented with a subfield of view of, for example, 90° to 110°, so that he may rotate his head by 50° to 60° to the left, right, up and down to look to other recorded areas within the total of approximately 210°. The headset may be similar to the output devices 107 as shown in FIGS. 1 and 2 and may comprise means for detecting a current location and orientation of a viewer's head which may, thereafter, be used to generate the output stream for the headset with correct motion parallax.

Figure 5:
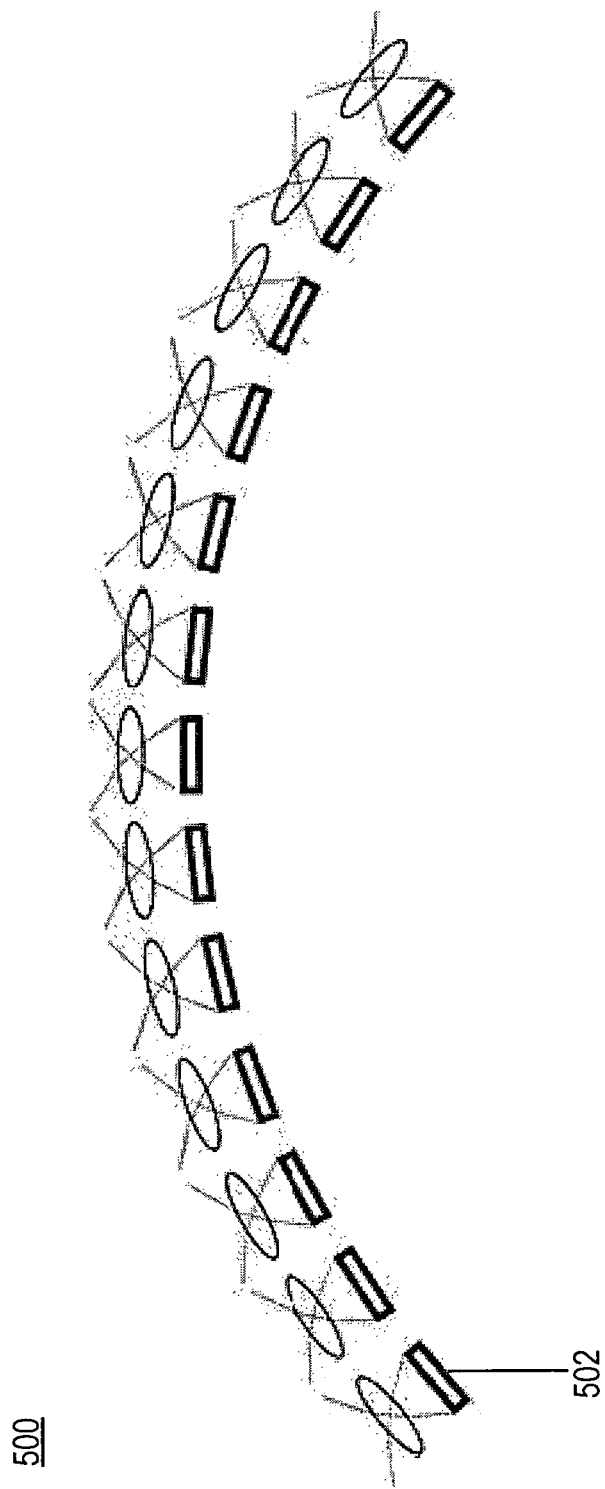
FIG. 5 shows yet another configuration of a camera device according to one embodiment of the present disclosure.

FIG. 5 shows yet another camera array of a camera device according to one embodiment of the present disclosure. The camera array 500 may include a plurality of cameras 502 which may be arranged on a curved surface. The cameras 502 may be spaced apart by a predetermined offset to equidistantly capture parts of a scene. The camera device 500 may enable capturing of a larger than 100° field of view without requiring wide angle lenses. Rather, the larger viewing angle is achieved by the curvature of the camera array.

Figure 6:
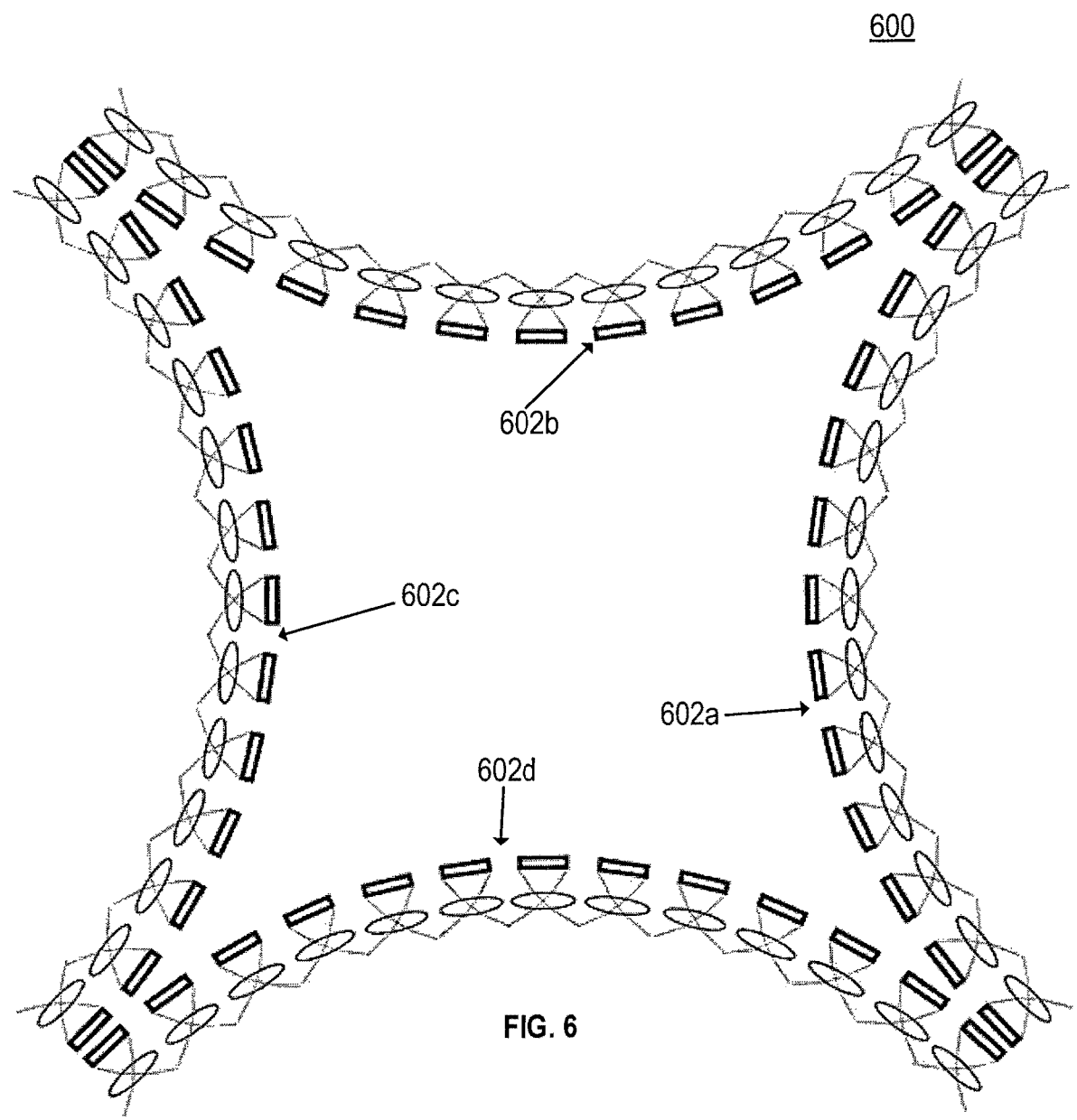
FIG. 6 shows a camera device with four camera arrays according to one embodiment of the present disclosure.

FIG. 6 shows a camera device according to one embodiment of the present disclosure. The camera device 600 includes a plurality of camera arrays 602a, 602b, 602c, 602d. Even though the camera arrays 602a, . . . , 602d are shown as including cameras arranged on a curved surface, the surface of one or more of the camera arrays 602a, . . . , 602d needs not to be curved and may rather be flat, in any combination. The cameras of each camera array 602a, . . . , 602d may be arranged on a concave surface. This may enable capturing of close-up scenes where objects of interest may be very near to the camera device 602. The outward extended ends of the concave camera arrays 602a, ..., 602d may be closer to the scene allowing the viewer to look "around-the-corner" to parts of the scene which may otherwise not be possible to see.

A field of view of up to 180° for the camera device 600 may be achieved without wide-angle lenses but instead with the concave curvature of the array itself. Each of the plurality of camera arrays 602a, ..., 602d may provide a viewing angle of up to 180°.

Figure 7:
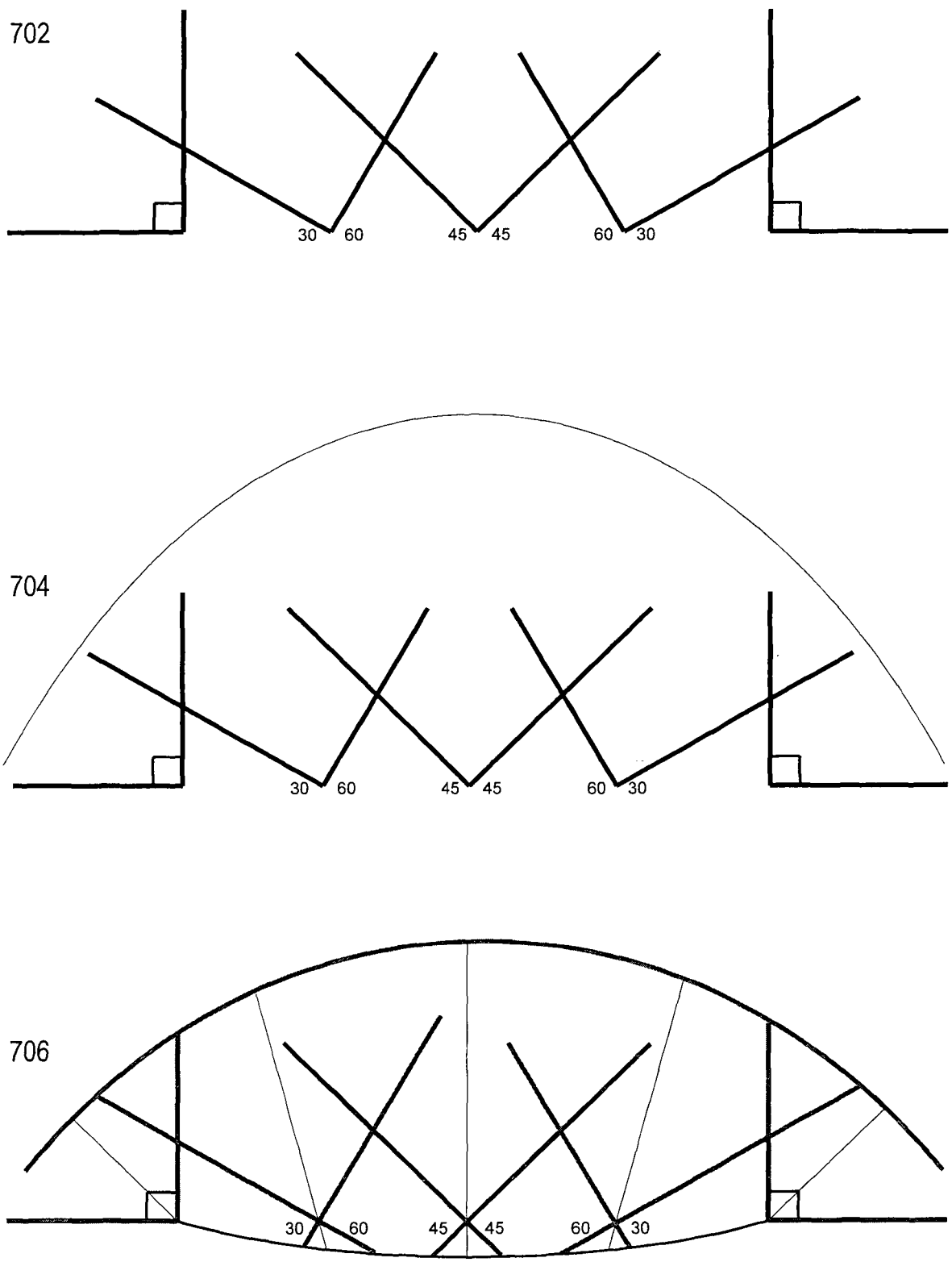
FIG. 7 shows alternative configurations of cameras in camera arrays according to embodiments of the present disclosure.

Due to the concave nature of the camera arrays 602a, ..., 602d the viewing angle at large angles to the right or to the left is captured by the sensors at the left-hand side of the camera arrays 602a, ..., 602d or on the right-hand side, respectively. A larger than 180° viewing angle for the camera device 600 may be achieved by combining a plurality of concave camera arrays, each with a viewing angle of up to 180°. By combining four concave camera arrays 602a, ..., 602d the camera device 600 may achieve a viewing angle of 360°. However, the use of four camera arrays 602a, ..., 602d is a preferred example only and less or more camera arrays could be used instead. For example, one or more of the four sensor arrays 602a, ..., 602d could be omitted to provide a viewing angle of less than 360°. Furthermore, the camera device 600 may be provided with additional camera arrays (not shown), which may be arranged perpendicular to the camera arrays 602a, ..., 602d facing in a Z direction, for example. FIG. 7 shows various configurations of viewing angles of individual camera sensors in a camera array of a camera device according to one or more embodiments of the present disclosure.

In a first example 702 the camera sensors in the camera array may be equidistantly spaced apart, but may have different orientations. For example, a first sensor may be rotated by 30°, a second sensor by 45° and a third sensor by 60° with respect to a base surface of the array. In this way a larger total viewing angle can be achieved. In this example each camera has a viewing angle of 90° while the six cameras combined have a viewing angle of 180°

In a second example 704 the position and orientation of sensors of example 702 could be used, wherein the sensors could further be equipped with an additional lens. The additional lens may further increase the total viewing angle beyond 180° of an example camera configuration.

In a third example 706 a partitioning of the field of view of individual camera sensors of a camera array on a curved surface is shown, which could be used to determine a number of media streams provided by the camera sensors in order to generate an output stream for a particular viewing position and/or orientation of an output device. In example 706, a concave curvature with similar advantages as the embodiment of FIG. 6 is used. The outward extended ends of the concave camera array may be closer to the scene allowing the viewer to look "around-the-corner" to parts of the scene which may otherwise not be possible to see. Contrary to the concave camera arrays 602 however, and because of the different orientation of the cameras, the viewing angle at large angles to the right is captured by the sensors at the right-hand side of the camera array in example 706, while the viewing angle at large angles to the left is captured by the sensors at the left-hand side of the camera array in example 706, respectively.

Figure 8:
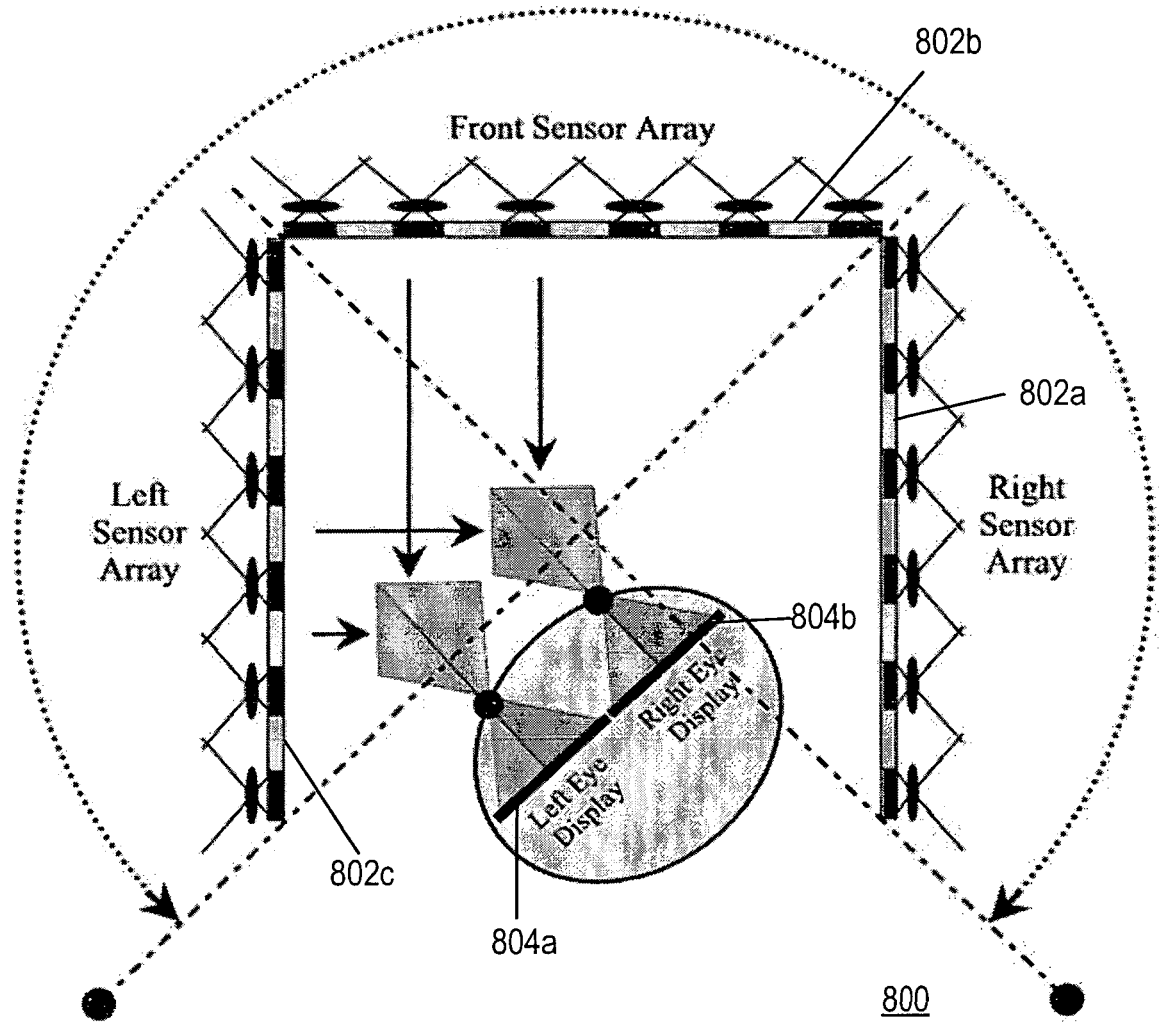
FIG. 8 shows a camera device according to yet another embodiment of the present disclosure.

FIG. 8 shows another embodiment of a camera device according to the present disclosure. The camera device 800 may include a plurality of two-dimensional arrays of cameras 802a, 802b, 802c, facing to the right, to the front and to the left. Furthermore, camera device 800 may include two further two-dimensional arrays (not shown) which may face to the bottom and to the top of the camera device 800. Hence, the two-dimensional arrays of the camera device 800 may represent five sides of six sides of a cube. The camera device 800 may be capable of capturing a very large viewing angle of approximately 270° in all directions, so that a viewer using a virtual reality or augmented reality headset or any other output device, such as the output device 107 as shown in FIGS. 1 and 2, looking at media, such as a movie, recorded using camera device 800 can look to the left, right, up and down in any direction.

If the displayed field of view in the output devices is approximately 90° to 110°, then the user may rotate his head by 80° to 90° to the left, right, up and down to look to other recorded areas within the total of approximately 210°. Wherever the user looks, he can be shown the reconstructed images with the correct parallax effect whenever he moves or rotates his head, by generating a suitable output stream for the headset.

In yet another embodiment, the set-up illustrated in FIG. 8 could also be adapted such that each camera array 802a, 802b, 802c may function as an individual camera device. It may be sufficient for each array 802a, 802b, 802c to have a reduced viewing angle of minimal 90°, preferably 100° or 110°. This viewing angle condition may allow the application of multiple sensor arrays (or multiple camera devices) positioned under a 90° angle with respect to each other.

In the embodiment shown in FIG. 8, five square array sensor boards may be used, each board may preferably work individually in the sense that each board may independently handle further processing of the captured media data, including, but not limited to one or more of video compression (temporal and spatial between camera sensors), motion vector, parallax vector detection, processing of parallax equivalent to Z buffering and/or artifact suppression.

Each board, therefore, may work as a 90° to 110° camera device according to embodiments of the present disclosure. In order to construct a 270° field of view camera device, five identical boards with sensor arrays arranged in the form of a cube may be used, where each board may handle its own part of the total 270° viewing angle and where the output of each board may be provided to separate display regions. However, it is to be understood that more or less differently arranged boards could be used.

As shown in FIG. 8, the provided media streams may be further processed and combined to generate output streams for a left eye and a right eye data of the output device. Even though left eye and right eye displays 804a, 804b are depicted within the camera device 800, this is only for illustrational purposes and the left-eye display 804a and right-eye display 804b typically will not be located within the camera device 800 when the media captured by the camera device 800 are presented on the displays 804a, 804b.

Preferred embodiments of the present disclosure may comprise one or more of the following features in any combination:

Physical or virtual cameras of a camera device may be spaced apart and oriented in a specific form factor in the camera arrays;

The camera devices according to embodiments of the present disclosure are enabled to capture a full 6 degrees of freedom parallax for a viewer, such as a VR/AR user;

This enables viewers to obtain accurate and correct image reproduction relative to their head/eye positions in respect to their own actual position in the 6 degrees of freedom space;

The camera array capture may be static. Hence, the resulting media streams may be stored and replayed in a subsequent presentation, wherein the plurality of media streams may be used to generate individual output streams adjusted to device positions and/or orientations with a correct motion parallax;

The camera devices according to embodiments of the present disclosure provide a plurality of media streams that may have depth information in mono or stereo, or have stereo and depth, or may have mono and depth, in any combination;

The media streams from the array of cameras can be processed, wherein processing may take place at a server or on the output device, such as a client device, itself;

The plurality of media streams may be processed for each individual output device, such as a VR client;

The processing of the plurality of media streams generates output streams of a high quality. In particular, the quality, such as resolution and color depth, of the output stream may correspond to the quality of the input media streams;

Each output device may compute, according to a current position and orientation of the output device, a virtual camera position and orientation with regard to a potential array of cameras. This computation may also be performed on a server handling a plurality of media streams;

Each output device may further process the plurality of media streams to generate an output stream with correct stereo properties;

The processing according to embodiments of the present disclosure may involve an analysis of the images of the plurality of media streams that may be combined with depth information from at least some cameras of the array of cameras to generate the desired output stream;

Additional warping techniques between the plurality of media streams or the plurality of output streams may be used to remove further latency and create a faster response on an output device, such as a headset;

The plurality of media streams as well as a plurality of output streams may be compressed for efficient transmission of the streams;

A compression of the media streams may include standard I, P and B frame techniques, wherein I defines intracoded, P defines (forward) predicted and B bidirectional predicted frames, which may be exploited for temporal compression and for spatial compression, using similarities of media data from adjacent or neighboring camera sensors;

The plurality of media streams may be interpolated for viewing purposes in respective output streams, such that a continuous head movement may result in continuous interpolated display images originating from a plurality of media streams; and An interpolation may particularly use data streams for surrounding or neighboring camera or camera sensors to interpolate an output stream from a virtual camera location that may be positioned and oriented between two, three, four or more real cameras or camera sensors of the camera device.

It is to be understood that the features may be combined in embodiments of the present disclosure in any combination.

While some embodiments have been described in detail it is to be understood that aspects of the present disclosure can take many forms. The claimed subject matter may be practiced or implemented differently from the examples described and the described features and characteristics may be practiced or implemented in any combination. The embodiments shown herein are intended to illustrate rather than to limit the invention as defined by the claims.

The invention claimed is:

1. A device comprising:
a media interface configured to provide a plurality of media streams, each media stream being captured with a full 6 degrees of freedom parallax using a camera of at least one array of cameras;
an input interface configured to receive a viewing position and orientation of a display device, the viewing position and orientation having 6 degrees of freedom; and
a processor configured to generate from the plurality of media streams a plurality of output streams based on the viewing position and orientation of the display device, wherein each output stream reflects the viewing position and orientation adjusted by an offset, wherein according to a current viewing position and orientation of the display device, the processor is further configured to warp between the plurality of output streams to an output stream nearest to the current viewing position and orientation of the display device.

2. The device according to claim 1 wherein the at least one array of cameras is configured to capture a scene, each camera of the at least one array being configured to capture at least a part of the scene according to camera parameters.

3. The device according to claim 1 wherein two or more media streams are determined as the n nearest media streams according to a field of view of the display device and parts of the scene captured by the cameras in the media streams.

4. The device according to claim 1 wherein at least a part of the plurality of media streams are pre-recorded media streams or live media streams.

5. The device according to claim 1 wherein the processor is further configured to combine at least one of the plurality of output streams with at least one computer graphics object, the device further comprising an engine communicatively coupled to the processor, said engine configured to provide the at least one computer graphics object according to the viewing position and orientation of the display device.

6. The device according to claim 1, wherein the processor is further configured to decode the plurality of media streams, wherein at least some of the plurality of media streams are compressed based on another one of the plurality of media streams.

7. The device according to claim 1 wherein the at least one array of cameras includes at least one lens with an ultra-wide angle.

8. The device according to claim 1 wherein at least one camera of the at least one array of cameras is a stereoscopic camera or a camera configured to capture depth information.

9. The device according to claim 1 wherein the cameras of the at least one array of cameras are arranged on a surface according to a pattern, wherein the surface is a flat or curved surface.

10. The device according to claim 1 comprising two or more arrays of cameras, wherein the arrays are rotated with respect to each other by a predetermined angle.

11. An output device comprising:
at least one display; and
means to detect a viewing position of the output device, the output device further comprising and being connected to a device according to claim 1.

12. The device according to claim 1 wherein at least one of the plurality of output streams includes a motion parallax effect adapted to motion of the display device.

13. The device according to claim 1 wherein the display device comprises a wearable display device.

14. A method comprising:
providing a plurality of media streams, each media stream being captured with a full 6 degrees of freedom parallax using a camera of at least one array of cameras;
receiving a viewing position and orientation of a display device, the viewing position and orientation having 6 degrees of freedom;
generating from the plurality of media streams a plurality of output streams based on the viewing position and orientation of the display device, wherein each output stream reflects the viewing position and orientation of the display device adjusted by an offset; and
according to a current viewing position and orientation of the display device, warping between the plurality of output streams to an output stream nearest to the current viewing position and orientation of the display device.

15. The method according to claim 14 further comprising determining two or more media streams as n nearest media streams according to a field of view of the display device and parts of the scene captured by the cameras in the media streams.

16. The method according to claim 14 further comprising:
combining at least one of the plurality of output streams with at least one computer graphics object; and
rendering the at least one computer graphics object according to the viewing position and orientation of the display device.

17. The method according to claim 14 further comprising decoding the plurality of media streams, wherein at least some of the plurality of media streams are compressed based on another one of the plurality of media streams.

18. The method according to claim 14 wherein at least one of the plurality of output streams includes a motion parallax effect adapted to motion of the display device.

19. The method according to claim 14 wherein the display device comprises a wearable display device.

20. A computing device comprising one or more processors and memory, the memory having stored thereon executable instructions configured to cause the one or more processors to perform steps including:
obtaining a plurality of media streams, each media stream being captured with a full 6 degrees of freedom parallax using a camera of at least one array of cameras;
receiving a position and orientation of a virtual reality headset in motion, the position and orientation having 6 degrees of freedom;
generating from the plurality of media streams a plurality of output streams based on the viewing position and orientation of the virtual reality headset, wherein each output stream reflects the viewing position and orientation of the virtual reality headset adjusted by an offset; and
according to a current viewing position and orientation of the virtual reality headset, warping between the plurality of output streams to an output stream nearest to the current viewing position and orientation of the virtual reality headset.

21. The computing device according to claim 20 wherein at least one of the plurality of output streams includes a motion parallax effect adapted to motion of the virtual reality headset.

* * * * *

UNITED STATES PATENT AND TRADEMARK OFFICE
CERTIFICATE OF CORRECTION

PATENT NO. : 11,196,972 B2  
APPLICATION NO. : 15/764696  
DATED : December 7, 2021  
INVENTOR(S) : C. Yerli Page 1 of 1

It is certified that error appears in the above-identified patent and that said Letters Patent is hereby corrected as shown below:

In the Claims

| Column | Line | Claim | |
|--------|------|-------|--|
| 22 | 20 | 20 | change "headset in motion," to -- headset, -- |

Signed and Sealed this  
Sixth Day of December, 2022

Katherine Kelly Vidal  
*Director of the United States Patent and Trademark Office*